US 6,696,655 B2

(12) United States Patent
Harbeck et al.

(10) Patent No.: US 6,696,655 B2
(45) Date of Patent: Feb. 24, 2004

(54) DEVICE AND METHOD FOR SORTING OUT METAL FRACTIONS FROM A STREAM OF BULK MATERIAL

(75) Inventors: Hartmut Harbeck, Wedel (DE); Gunther Petzold, Rellingen (DE); Gerd Reischmann, Tornesch (DE)

(73) Assignee: Commodas GmbH, Wedel (DE)

( * ) Notice: Subject to any disclaimer, the term of this patent is extended or adjusted under 35 U.S.C. 154(b) by 0 days.

(21) Appl. No.: 10/182,078

(22) PCT Filed: Jan. 12, 2001

(86) PCT No.: PCT/DE01/00108
§ 371 (c)(1),
(2), (4) Date: Sep. 23, 2002

(87) PCT Pub. No.: WO01/54830
PCT Pub. Date: Aug. 2, 2001

(65) Prior Publication Data
US 2003/0038064 A1 Feb. 27, 2003

(30) Foreign Application Priority Data
Jan. 27, 2000 (DE) .......................................... 100 03 562

(51) Int. Cl.⁷ ............................................... B07C 5/344
(52) U.S. Cl. ...................... 209/571; 209/574; 209/552; 209/930
(58) Field of Search ................................ 209/930, 929, 209/552, 574

(56) References Cited

U.S. PATENT DOCUMENTS 3,702,133 A * 11/1972 Vibert et al. ................ 209/214
3,824,516 A * 7/1974 Benowitz ..................... 335/284
4,062,767 A * 12/1977 Rudy ............................ 209/212
4,137,156 A * 1/1979 Morey et al. ................ 209/212
4,459,206 A * 7/1984 Laithwaite ...................... 209/3
5,161,695 A * 11/1992 Roos ............................. 209/11

FOREIGN PATENT DOCUMENTS

FR        2657696 A1 *  8/1991    ........... B07C/5/344

* cited by examiner

Primary Examiner—Donald P. Walsh
Assistant Examiner—Jonathan R Miller
(74) Attorney, Agent, or Firm—Larson & Larson, PA; James E. Larson

(57) ABSTRACT

The invention relates to a device and a method for blowing out metal fractions from a stream of bulk material that is conveyed by bulk material means. The device comprises blow-out nozzles which are located on a drop section, and which are arranged along a width-wise extension of the stream of bulk material, for blowing against individual particles of bulk material in order to modify the trajectory in such a way as to produce a second sub-stream that branches off. The blow-out nozzles can be controlled according to the sensor coil scanning results relating to the bulk material particles. A plurality of sensor coils is provided underneath an essentially horizontal section of the stream of bulk material in the form of an LC oscillating circuit. Said sensor coils are provided for detecting the eddy currents that are induced. Optoelectronic means are also provided for determining the blow-out position and for determining the location of each of the particles of bulk material.

17 Claims, 2 Drawing Sheets

DEVICE AND METHOD FOR SORTING OUT METAL FRACTIONS FROM A STREAM OF BULK MATERIAL

PRIOR APPLICATIONS

This application bases priority on International Application No. PCT/DE01/00108, filed Jan. 12, 2001, which in turn bases priority on German Application No. DE 100 03 562.0, filed Jan. 27, 2000.

BACKGROUND OF THE INVENTION

1. Field of the Invention

The invention relates to a device and method for sorting out or extracting metal fractions from a bulk material stream.

2. Description of the Prior Art

It is necessary to sort out or separate metal fractions from the most varied bulk material streams. In the simplest case they are constituted by crown corks of beer bottles and aluminum parts from a broken glass bulk material stream. However, it is also necessary to sort on the basis of their different metal and non-metal fractions, non-homogeneous bulk material streams, e.g. shredded car parts. In particular, the stainless steel fraction has to be separated from other fractions. In the same way as nonferrous metals, stainless steel is not very ferromagnetic.

Such a method is described in DE-A1-35 13 664, in which an inductance-variable detector coil on a refuse chute controls a compressed air nozzle, which blows away nonferrous metals. Quite apart from the limited local resolution, which is just sufficient for the detection of aluminum cans, the problem arises that varying inductance changes for different materials and also different object sizes do not allow clear information to be provided with regards to the optimum blow-out point. It is always only possible to blow out a specific fraction and not, if different compositions exist, the smaller fraction for whose blowing out only reduced costs are involved.

It is impossible to blow out non-metals, although this is highly desirable in the case of crushed car scrap.

As a result of saturation effects, particles bringing about a strong inductance change can desensitize the coil for such a long time that it is necessary to accept a significant level of incorrect sorting or extremely slow feed rates.

Methods of the type described, e.g. in DE-A1-40 14 969 are consequently not very suitable for correctly detecting metal and for the different handling of different metal fractions.

The parallel detection of both the color and the presence of metal requires a considerable amount of time which, as described in DE-A1-40 17 129, gives rise to slow bulk material conveying rates.

Other proposals, such as e.g. those of DE-A1-42 35 956, in which the fine surface structure of the materials are determined by bombarding with electromagnetic waves, are much too complicated and costly during evaluation, and require a time-consuming logic consideration. In addition, proposals have already been made for increasing the separation efficiency of material mixtures, such as e.g. in German utility model DE-U-93 09 786.

Finally, DE-A1-40 17 274 describes an apparatus for detecting and separating metal particles, in which different down pipes are provided with detector coils, which in each case control a flap mechanism for deflecting fluid bulk material. In the case of shredded material, e.g. car scrap, unavoidably there are certain parts which are well above the nominal size, and which would immediately block such pipes. However, even in the case of bulk material such pipes tend to become blocked.

It is also desirable, as a function of the bulk material to be sorted, to be able to readjust the separation efficiency in order to take account of different bulk material prerequisites and enable the sorting out of the in each case desired fractions.

Thus, it is e.g. known that there can be considerable differences in shredded car scrap as a function of the country of origin. Whereas, European car scrap contains a large amount of light alloys and plastic parts, in the scrap from U.S. cars, there are far more stainless steel parts, whose sorting out is correspondingly worthwhile.

It is also known that the size and shape of the parts to be sorted are dependent on the nature of the shredding machine, quite apart from the materials used in the vehicles. However, once a first batch has been supplied by a particular preprocessing plant, it is generally to be assumed that over a long period (the next years), parts with a similar size and shape will arrive and the sorting parameters when operating the sorting apparatus, consequently, remain substantially the same.

The problem of the invention is to provide a method and apparatus for sorting out such metal fractions, sorting out having to take place rapidly and also reliably in the case of larger parts.

Specifically, in the case of larger parts, it is necessary to control the blow-out nozzles in such a way that the parts are correctly blown out, because too sort or too early blowing (such as arises with large objects through a premature response of the prior art metal detectors) will not lead to the parts being correctly brought into a new trajectory. In the case of shredders, there are also many elongated parts, which are difficult to blow out.

SUMMARY OF THE INVENTION

According to the invention, this problem is solved by the features of the main claim. The subclaims provide advantageous embodiments of the invention.

It is in particular advantageous that as a result of the inventive arrangement of an electromagnetic sensor below advantageously a horizontally directed conveyor belt, it is not only possible to determine the digital signal metal (YES/NO), but also a signal pattern from whose details, particularly its edge rise, conclusions can if necessary be drawn concerning the size and the material of the individual parts.

As a result of the position of the essentially flat parts on the conveyor belt, it is possible to consider the distance between the mass center and the sensor to be identical for all the parts.

By means of the sensor described in the second part of the description relative to the drawings, it is possible to generate eddy currents in a metal part to be separated, particularly an aluminum or stainless steel part, which in turn builds up a magnetic field acting in opposition to the excitation field. As a result of the buildup of the field, but in particular through line losses to which the eddy currents are exposed in the metal, an energy loss is brought about in the field-generating sensor, which as damping of said oscillator is in order for the size, spacing and dimensions of the object. The individual particles to be sorted out are slightly heated by the eddy currents.

Admittedly, use has already been made of the generation of opposing fields by eddy currents, induced by very strong fields in order to deflect from the trajectory in which the rotational fields arise, but this deflection is determined by the geometry of the object and the eddy currents flowing in said object and less by the actual material, and is not of an optimum nature in its directional component.

However, the invention "misses" the particle and controls a blow-out nozzle bar, which provides the particle with a suitable air stream for ejection during a drop section, which e.g. follows a horizontally directed conveyor belt. Thus, for the selected particles an always identical trajectory is much more reliably ensured than by a very strong field, which induces eddy currents in all the objects with a different intensity for ejection purposes.

In addition, the invention makes it possible to mathematically evaluate the data detected for an object, namely the size, the strength of the eddy current caused (the steepness of an edge rise in the signal pattern enabling conclusions to be drawn thereon), in which the strength of the back-indication of the object, i.e. either its weight or in the case of comparable weights of the particles its material, 1) can be determined by mathematical integration over the surface area of a "peak", or which can be easily implemented from the apparatus standpoint in the plant by, 2) can be taken into account by modifying the distance from the changed sensor and the bulk material stream, so that in both cases, the response limits for separation can be easily changed.

A major advantage is provided by the optional, optical determination of the particles on the belt or at the start of the drop section, because it provides the possibility of more precise positional information to blow against the centers of gravity of the particles by means of the air nozzles which are provided with precisely determined action points and much more densely provided than the coils, so as to bring about an optimum trajectory change.

Through a plurality of sensors, which can be juxtaposed at right angles to the bulk material stream, it is possible to monitor the entire bulk material stream and provide a further metal/no metal information concerning the optically detected objects, and in the case of an adequate separation efficiency, to permit a decision to be made concerning the nature of the metal by means of the object size and sensor information.

As the field distribution of any LC sensor coil drops strongly towards the edge, it is proposed that there are at least two mutually displaced rows.

The invention also proposes, in addition to the sensors equidistantly spaced with respect to the bulk material stream, the provision of further sensors with different spacings with respect to said stream, so as in this way to detect fractions with significantly different response ranges in the bulk material stream, and consequently permit the sorting out of certain fractions between the upper and lower limits.

However, it is also possible to provide additional optoelectronics sensors, which can qualify the signals obtained from the electromagnetic detection with optoelectronically detected signals, i.e. for example the size and color of the object.

Another advantage of the invention is the possibility of logical reversal, i.e. either the blowing out of utilizable metal fractions or the blowing out of utilizable plastic fractions, as a function of which provides the desired, marketable fraction in the most type-pure form.

DESCRIPTION OF THE DRAWINGS

Further features and advantages of the invention can be gathered from the attached drawings, wherein.

DETAILED DESCRIPTION OF THE PREFERRED EMBODIMENT

Figure 1:
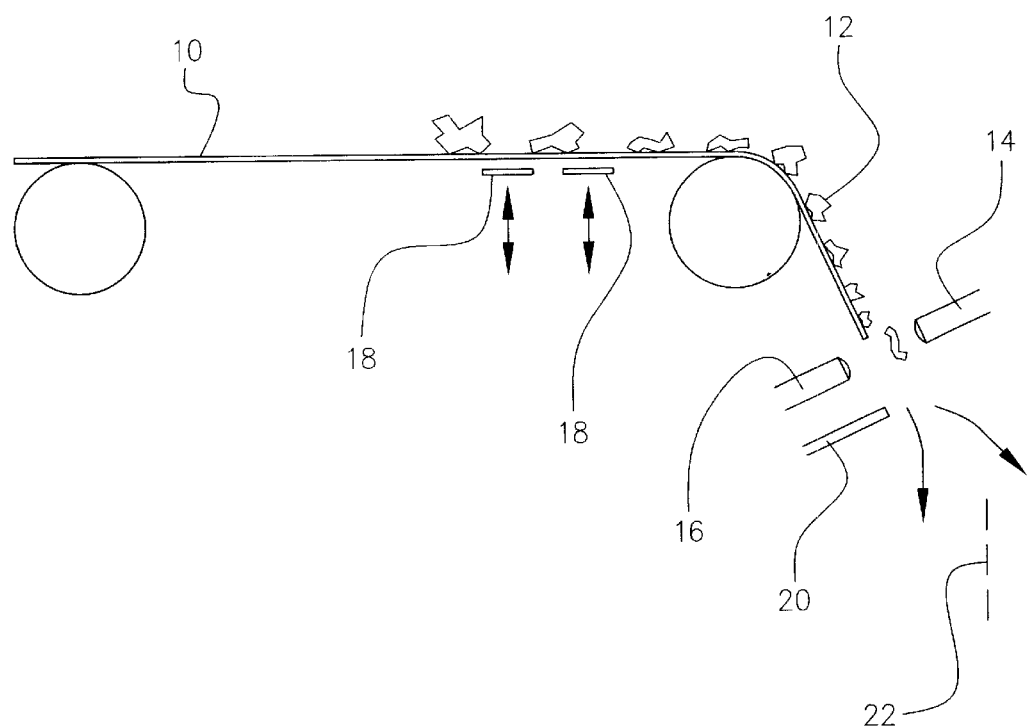
FIG. 1 shows a diagrammatic representation of a sorting apparatus according to the method of the invention.

As is diagrammatically indicated in FIG. 1, the apparatus has bulk material-conveying means 10, namely a conveyor belt, to which is optionally connected a gravity chute 12 in the first part of a drop section for parallelizing the individual particles.

In free fall, the individual objects are then detected by a line camera 14, which line-wise images the object flow and passes the signals thereof to an electronic system, which detects with an evaluating means a plurality of lines of individual objects and subdivides said objects into color, and possibly shape classes, and in particular, for each object determines the sensor information in questions from the detector coils 18 in order on the basis thereof to supply a positionally precise blow-out command to a row of blow-out nozzles 20.

Thus, the blow-out nozzles 20 can also blow-out elongated objects, and those for which the sensor coils 18 did not respond, in that the trajectory is modified, e.g., to the right behind a partition 22.

As the sensor coils 18 have a worse response behavior at the edge than in the center, it is proposed that they be arranged in two, mutually displaced rows. The time displacement on response (from top to bottom in FIG. 2) to bulk material particles can be compensated without great expense by signal processing means on the way to the control electronics.

Due to the fact that the plurality of sensor coils 18 in the form of LC resonant circuits is located under a substantially horizontal portion of the bulk material stream, has the advantage that the spacing variable with respect to the coil, which has a very marked effect on the result, varies to a minimum degree between individual objects, because they generally come with their center of gravity closest to the conveyor belt. The resonant circuits induce high frequency eddy currents, whose presence gives rise to a damping of the coils 18, which indicates the presence of a metal particle, but not yet suitable for determining the blow-out position. Even a plurality of sensor rows only supplies this information in an inadequate form, so that additional optoelectronic means, namely the line camera 14 are provided for determining the position of each bulk material particle. A lighting means 16 can be provided in transmitted light or in incident light. The camera 14, lighting system 16 and blow-out nozzles 20 can also be located on the trajectory side opposite to that shown in FIG. 1, or two or more cameras can be used for observing both the front and rear. Such a variant is particularly suitable for the correct sorting out of composite materials, such as increasingly occur in car scrap.

Thus, in the case of composite materials, it is possible to detect whether e.g. there are hoses with metal clips, so that a predetermination can take place in the software of the plant regarding their supply to one of the fractions. It can be desirable either as a result of the small metal part to supply them to the metal fraction or due to the preponderant rubber part to the nonferrous fraction.

Figure 2:
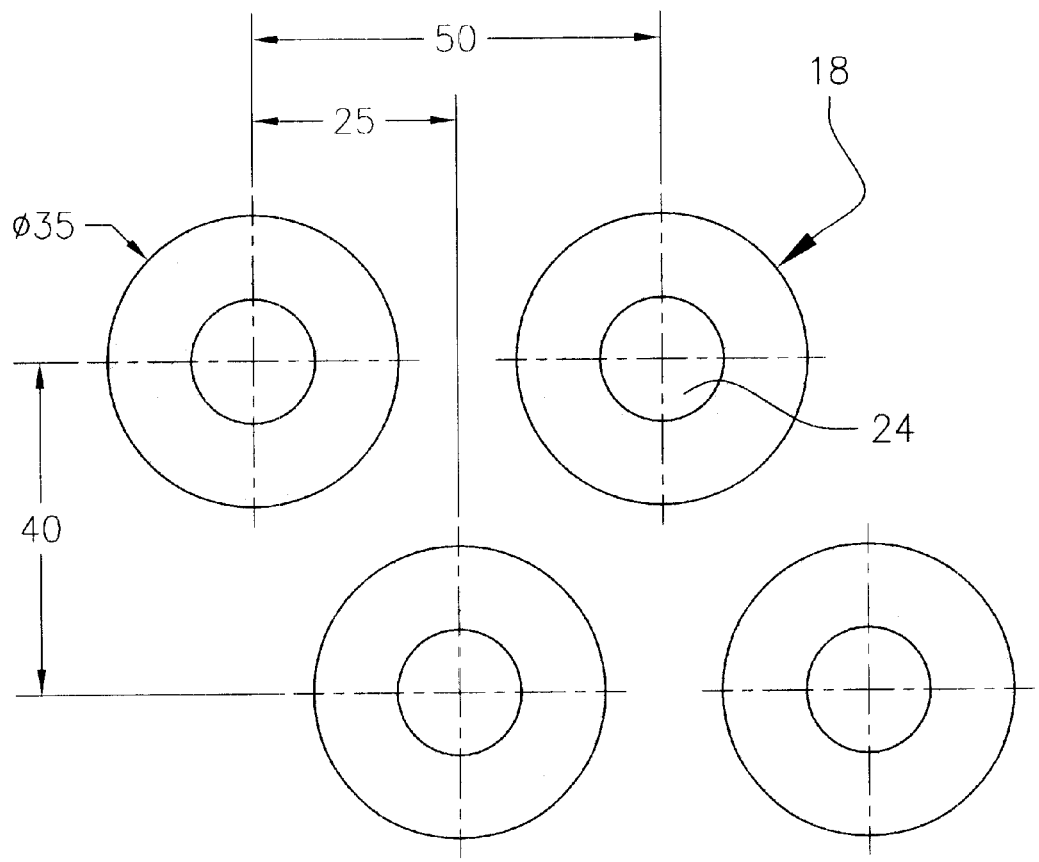
FIG. 2 shows the geometry of the coil arrangement for the sorting apparatus of FIG. 1.

It is advantageous to operate very small sensor coils 18 with a high frequency of approximately 100 kHz. Thus, as shown in FIG. 2, for coil dimensions of 35 mm and a center-to-center spacing in a row of 50 mm, there is a sensor grid scale of 25 mm, i.e. an overlap of in each case 10 mm on each side of the coil, which corresponds to the hatched outer area.

With a working width of e.g. 1200 mm and a product speed of 2.0 m/s, in the case of 48 sensors per line and a scanning rate of 0.2 kHz with a particle size of 50 mm, there are 8 measured values per particle, which readily permits an evaluation of the signal edges.

Image processing can then improve the vertical resolution of the metal sensor means from 10 to 1 mm, because here working can take place with a grid scale of 0.5 mm and a scanning rate of 2 kHz.

The sensor coils 18 are arranged in a pot emitting the flux lines in closely concentrated manner upwards through an open end side and which is constructed in one piece with a centrally, perpendicularly positioned ferrite core 24 (diameter approx. 10 mm).

The operating voltage is advantageously 20 to 30 V DC, and for adjusting the response sensitivity, besides a potentiometer, there are means for the displacement of the sensor coils 18 of a line away from the bulk material stream at different distances therefrom.

From the apparatus standpoint, this is brought about by means of a vertical drawer precisely adjustable by means of spindle drives for in each case one line of sensor coils 18, displaceable in program-controlled manner more rapidly by electromagnets in at least two different planes.

The signals received by each coil are supplied via a demodulator to a trigger circuit for signal evaluation with respect to the signal level.

What is claimed is:

1. A method for sorting out metal fractions from a bulk material stream, the steps of the method comprising:
    a) providing a bulk material particles conveying means wherein particles of the bulk material stream move along the conveying means in a predetermined arranged width;
    b) providing a drop section along a distal end of the bulk material conveying means;
    c) providing a plurality of sensor coils positioned below the bulk material conveying means;
    d) scanning the bulk material stream particles by the plurality of sensor coils;
    e) providing an optical determination device for determining the position of the bulk method particles;
    f) providing a plurality of blow-out nozzles positioned proximal to the bulk material conveying means drop section, each blow-out nozzle being individually controllable as a function of a scanning result from the sensor coils;
    g) determining an edge rise of a damping of in each case one of a multiplicity of high frequency fields induced by LC resonant circuits formed on a horizontal portion of the bulk material stream;
    h) evaluating each edge rise; and
    i) controlling at least one of the plurality of blow-out nozzles for deflecting the particles into a branched partial stream by selectively blowing against individual bulk material stream particles.

2. The method of claim 1,
    a) wherein the optical determination device is positioned at a bottom portion of the bulk material conveying means drop section;
    b) obtaining optically determined data from the optical determination device; and
    c) correlating a determined electromagnetic characteristic of each bulk material stream particle with the optically determined data such that the particle can be identified.

3. The method of claim 2, wherein the optically determined data obtained by the optical determination device is high resolution color data.

4. The method of claim 2, wherein the optical determination device is at least one line camera.

5. The method of claim 1, wherein the bulk conveying means is a conveyer belt.

6. The method of claim 1, wherein the bulk material conveying means drop section is a gravity chute.

7. The method of claim 1, wherein the set of sensor coils form the LC resonant circuits.

8. An apparatus for sorting out metal fractions from a bulk material stream, the apparatus comprising:
    a) a conveyor belt having a distal end for moving the bulk material stream along a pathway;
    b) a drop section having a bottom end and located at the conveyor belt distal end;
    c) at least one blow-out nozzle positioned directly below the drop section bottom end for blowing against individual particles of the bulk material stream and for separating the particles into a second branched stream;
    d) a plurality of sensor coils disposed below a horizontal portion of the conveyor belt for forming a plurality of LC resonant circuits, the plurality of LC resonant circuits detecting induced eddy currents in the particles of the bulk material stream moving along the conveyor belt;
    e) calculating means for evaluating a signal pattern of the induced eddy currents and for determining a position of the at least one blow-out nozzle; and
    f) optoelectronic means for determining the location of each particle of the bulk material stream.

9. The apparatus of claim 8, wherein the plurality of sensor coils operate with a high frequency of approximately 100 kHz.

10. The apparatus of claim 8, wherein the plurality of sensor coils are located within a potentiometer emitting flux lines upwardly through an open end side thereof.

11. The apparatus of claim 10, wherein each of the plurality of sensor coils located within the potentiometer are constructed as one piece with a centrally and vertically disposed ferrite core.

12. The apparatus of claim 8, wherein the plurality of sensor coils are arranged in at least two staggered lines at right angles to the bulk material direction of movement.

13. The apparatus of claim 12, wherein the plurality of sensor coils in each line are jointly displaced at different distances away from the bulk material stream.

14. The apparatus of claim 8, wherein the plurality of sensor coils produce signals which are supplied by a demodulator of a trigger circuit.

15. The apparatus of claim 8, wherein the plurality of sensor coils are vertically displaced to the conveyor belt horizontal portion.

16. The apparatus of claim 8, wherein the conveyor belt drop section is a gravity chute.

17. The apparatus of claim 8, wherein the optoelectronic means is at least one line camera positioned below the drop section bottom end.

* * * * *